United States Patent [19]

Condon

[11] Patent Number: 5,267,710
[45] Date of Patent: Dec. 7, 1993

[54] PIPE HANGING CLAMP ADAPTED FOR SOLDERING

[76] Inventor: Duane R. Condon, 2330 Raymond Ave., Ramona, Calif. 92065

[21] Appl. No.: 951,227

[22] Filed: Sep. 25, 1992

[51] Int. Cl.⁵ ............................................. F16L 3/08
[52] U.S. Cl. ........................................ 248/65; 248/56
[58] Field of Search ...................... 248/49, 56, 57, 62, 248/65, 73, 74.1; 4/695, 419, 661

[56] References Cited

U.S. PATENT DOCUMENTS

| | | | |
|---|---|---|---|
| 2,773,708 | 12/1956 | Beyerle | 248/57 X |
| 2,992,800 | 7/1961 | Madson | 248/74.1 X |
| 4,379,537 | 4/1983 | Perrault et al. | 248/74.3 |
| 4,550,451 | 11/1985 | Hubbard | 248/56 X |
| 4,907,766 | 3/1990 | Rinderer | 248/57 |
| 5,024,405 | 6/1991 | McGuire | 248/73 |
| 5,050,824 | 9/1991 | Hubbard | 248/57 |
| 5,154,315 | 10/1992 | Condon | 248/73 |

*Primary Examiner*—Ramon O. Ramirez
*Attorney, Agent, or Firm*—Baker, Maxham, Jester & Meador

[57] ABSTRACT

A generally L-shaped clamp for rigidly mounting a copper water pipe to a segment of HYCO strap. The clamp has a pipe supporting portion with a hole for receiving a segment of copper water pipe therethrough. The clamp further has a strap backing portion connected to the pipe supporting portion for overlying a side surface of a segment of HYCO strap. At least one locator element extends from the pipe supporting portion for insertion into a preselected hole in the strap. A bracket portion extends a right angle from a side of the strap backing portion opposite the pipe supporting portion. Flanges which extend from the pipe supporting portion and springs which extend from the bracket portion engage opposite side edges of the strap to hold the clamp in position. The clamp is preferably stamped from the single piece of sheet steel which is copper plated so that the copper water pipe can be soldered directly to the clamp.

18 Claims, 1 Drawing Sheet

PIPE HANGING CLAMP ADAPTED FOR SOLDERING

BACKGROUND OF THE INVENTION

The present invention relates to building construction, and more particularly to plumbing fixtures used to mount water pipe to studs or joists.

Copper water pipe should not be supported over long distances by extending through holes drilled in studs. Such holes are time consuming to drill and weaken the strength of the studs. Also, water hammer in the pipe can cause the pipe to move in the studs since the holes are typically larger than the outside diameter of the pipe.

A large number of pipe hanging clamps have been developed in the past for supporting thin walled copper water pipe in building constructions. These clamps need to accommodate thermal expansion of the copper pipe. The clamps should not be made of dissimilar metal since galvanic action can cause corrosion.

The following is a list of U.S. Pat Nos. showing various clamps and hangers in this field:
2,216,886—Titled: Holder—Langelier
2,992,800—Titled: Pipe Hanger—Madson
3,503,580—Titled: Universal Conduit Support Bracket—Levy
3,684,223—Titled: Pipe Clamp—Logsdon
4,369,945—Titled: Cable Clamps—Mantoan et al
4,379,537—Titled: Cable Hanger—Perrault et al.
4,714,218—Titled: Hanger for Pipe Clamp—Hungerford, Jr.

More recently it has been common to surround the pipe with clamps hung on straps nailed between studs. Strap material of this type is widely used and is sold under the trademark HYCO. It has holes punched in the center at regular intervals.

Of the foregoing patented devices, the pipe clamp of U.S. Pat. No. 3,684,223 of Logsdon has been widely used by plumbers. However, it must either be nailed to a stud or secured with screws or bolts to a HYCO strap, which adds time and cost to the plumbing installation.

The pipe hanging clamp disclosed in U.S. Pat. No. 5,024,405 of McGuire has a central peg and two other pegs on either side of the central peg. This device can be rotated into engagement with corresponding holes in a HYCO strap. The principal drawback of this device is that the holes in the HYCO strap are not precision drilled and the pegs are not precisely located on the clamp due to tolerance variations in the injection molding. Therefore it is sometimes difficult, if not impossible, to align the pegs with a pair of holes in the HYCO strap. Also, removal of the McGuire device from the HYCO strap once it has been snapped into place is extremely difficult. This makes it hard to re-mount the clamp if the plumber misjudges the initial location for the pipe mounting. Additionally, the McGuire device requires two steps, namely, mounting the device onto the strap and then squeezing the mating ratchet and pawl portions together around the pipe. Plumbers frequently squeeze the pipe too tightly and the plastic parts fatigue. Also, the ratchet and pawl sometimes break away from the base portion of the McGuire device.

The HOLD-RITE device manufactured by Hubbard Enterprises permits a water pipe to be soldered to a metal strap having alternating larger and smaller holes. See U.S. Pat. No. 4,550,451.

In my U.S. Pat. No. 5,154,375 granted Oct. 13, 1992 entitled PIPE HANGING CLAMP, there is described a unitary injection molded plastic clamp for easily and rapidly attaching copper pipe to HYCO strap so that the pipe extends perpendicular to the plane of the strap. In my co-pending U.S. patent application Ser. No. 07/913,154 filed Jul. 14, 1992 entitled CLIP-ON PIPE HANGING CLAMP there is described another unitary injection molded plastic clamp for easily and rapidly attaching copper pipe to HYCO strap so that the pipe extends in the plane of the strap.

While my aforementioned injection molded plastic pipe hanging clamps represent significant improvements over the aforementioned prior art pipe hanging clamps, there are some applications where it is necessary to solder the copper pipe to a hanger which is attached to a segment of HYCO strap. For example, a stub out for a hose bib must be securely attached to HYCO strap in such a manner that it is virtually impossible to pull it out. Also, in some applications, it is necessary that a pipe be mounted so that there is absolutely no capability for movement of the pipe due to, for example, water hammer. My aforementioned plastic pipe hanging clamps permit a minor degree of flex or movement and with sufficient force, a pipe mounted with the same could be torn away from the HYCO strap, e.g. by excessive manual pulling.

SUMMARY OF THE INVENTION

It is therefore the primary object of the present invention to provide an improved pipe hanging clamp to which copper pipe may be soldered and then mounted to a segment of metal strap with spaced holes therethrough.

The present invention provides a generally L-shaped clamp for rigidly mounting a copper water pipe to a segment of HYCO strap. The clamp has a pipe supporting portion with a hole for receiving a segment of copper water pipe therethrough. The clamp further has a strap backing portion connected to the pipe supporting portion for overlying a side surface of a segment of HYCO strap. At least one locator element extends from the pipe supporting portion for insertion into a preselected hole in the strap A bracket portion extends a right angle from a side of the strap backing portion opposite the pipe supporting portion. Flanges which extend from the pipe supporting portion and springs which extend from the bracket portion engage opposite side edges of the strap to hold the clamp in position. The clamp is preferably stamped from the single piece of sheet steel which is copper plated so that the copper water pipe can be soldered directly to the clamp.

DESCRIPTION OF THE PREFERRED EMBODIMENT

Figure 5:
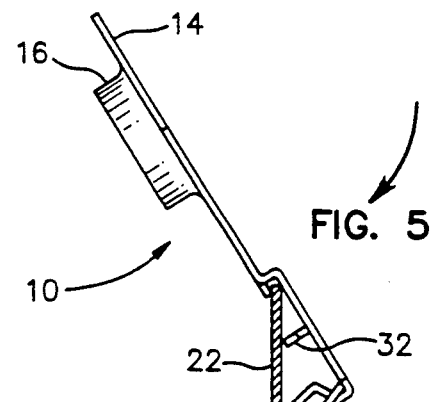
FIG. 5 is a side elevation view of the preferred embodiment of my solderable pipe hanging clamp during the initial stages of its mounting over a segment of HYCO strap shown in cross-section.
Figure 4:
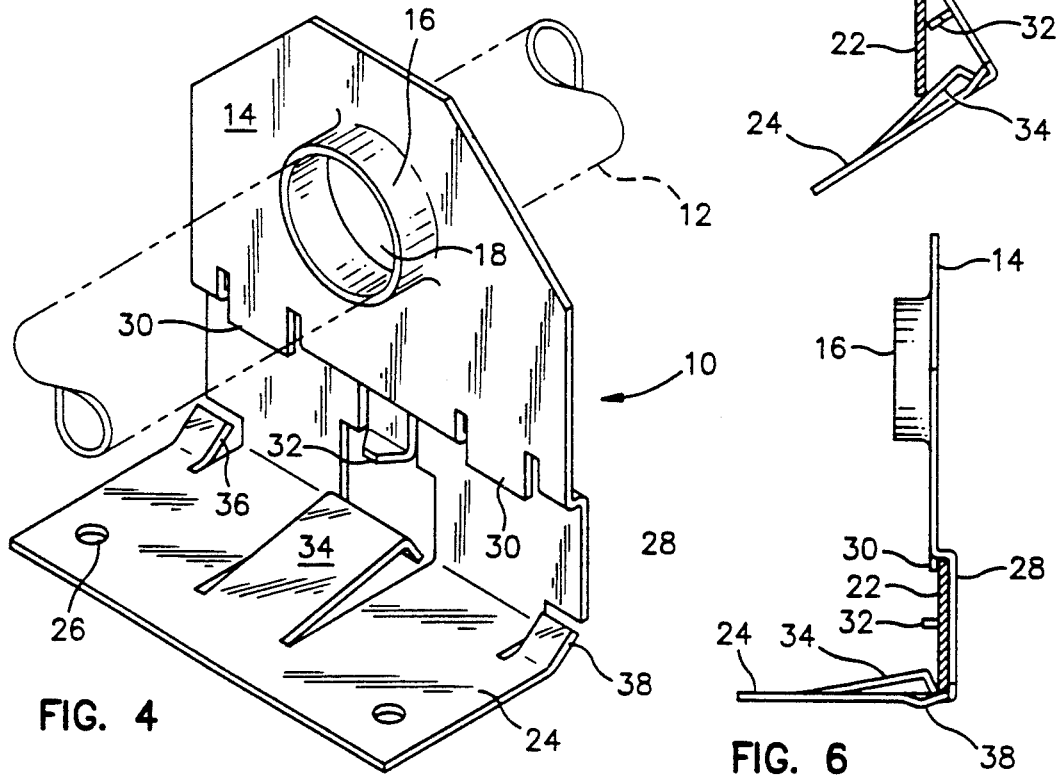
FIG. 4 is a perspective view of the preferred embodiment of my solderable pipe hanging clamp showing a copper water pipe extending therethrough in phantom lines.
Figure 6:
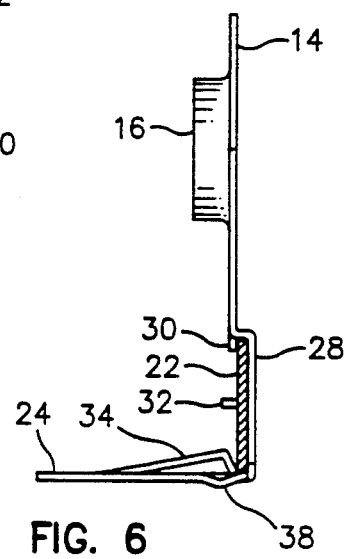
FIG. 6 is a side elevation view of the preferred embodiment of my solderable pipe hanging clamp after it has been fully mounted over a segment of HYCO strap shown in cross-section.

A preferred embodiment of my pipe hanging clamp 10 is illustrated in the perspective view of FIG. 4. The clamp is used in constructing buildings and, in particular, in mounting a copper water pipe 12 so that it is firmly supported between studs or joists (not illustrated). The clamp has a generally A-shaped planar pipe supporting portion 14. The portion 14 includes a flared portion 16 defining a hole 18 through which a segment 20 of standard one-half inch diameter copper pipe extends in a snug manner that facilitates soldering. The clamp 10 is made of copper plated steel and the pipe segment 20 is soldered thereto after it is slid through the hole 18. The clamp 10 is hung or mounted on a segment 22 of HYCO strap (FIGS. 5 and 6). An orthogonal bracket portion 24 of the clamp 10 has spaced holes 26 punched therein. The planar portion 14 and the bracket portion 24 are connected by a strap backing portion 28. The clamp 10 may be snapped over the HYCO strap 22 as shown in FIGS. 5 and 6. Alternatively, nails or screws (not illustrated) may be inserted into the holes 26 in the clamp 10 to fasten it to the strap 22 so that it extends perpendicular thereto.

Figure 1:
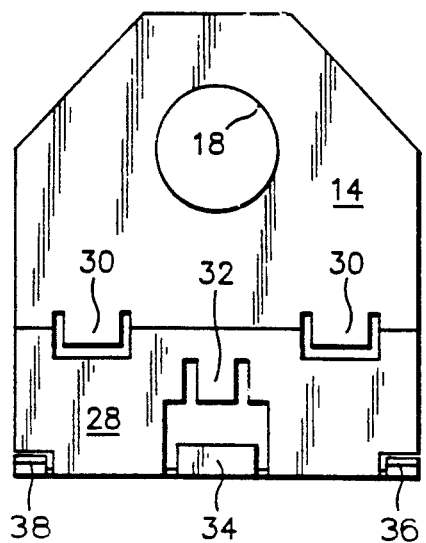
FIG. 1 is a front elevation view of a preferred embodiment of my solderable pipe hanging clamp.

The clamp 10 has a generally L-shaped configuration as best seen in FIGS. 5 and 6. The strap backing portion 28 overlies a first side surface of the strap 22 as shown in FIG. 6. A pair of flanges 30 (FIG. 1) extend from the pipe supporting portion 14 and engage a first side edge of the strap 22. The flanges 30 also overlie a second side surface of the strap 22 as shown in FIG. 6. A locator element 32 (FIG. 4) also extends from the pipe supporting portion 14. The locator element 32 has a tapered distal end which can deflect for insertion into a preselected hole in the strap 22 to fix the position of the clamp 10. The spring force of the locator element 32 restores it to the position shown in FIG. 6.

A spring 34 (FIG. 4) extends from the bracket portion 24 and engages a second side edge of the strap 22 as best seen in FIG. 6. A pair of additional springs 36 and 38 also extend from the bracket portion 24 on either end thereof for deflecting and engaging the second side edge of the strap 22 as illustrated in FIG. 6. The spring 34 has a distal end which is bent down and away from the locator element 32. The springs 36 and 38 are bent upwardly toward the pipe supporting portion 14. They keep the clamp rigidly mounted to the strap 22 despite minor variations in the width of the strap.

Referring to FIG. 5, the manner of installation of mounting of the pipe hanging clamp 10 over the secured piece of HYCO strap 22 can be best understood. The pipe hanging clamp is first angled so that the flanges 30 can be engaged over the first side edge of the strap 22. The tapered distal end of the locator element 32 is then inserted into the selected hole in the HYCO strap 22 by rotating the pipe hanging clamp 10 in a clockwise direction indicated by the arrow in FIG. 5 to the position illustrated in FIG. 6. This initially depresses the spring 34 downwardly until it returns to the position illustrated in FIG. 6. The ends of the springs 36 and 38 engage the second side edge of the strap 22. The clamp 10 thus "snaps" over the strap and the springs hold the pipe hanging clamp firmly in position.

The illustrated embodiment of my pipe hanging clamp may be stamped from a single piece of sheet steel of appropriate gauge. All of the cuts and bends may be made with dies in multiple stamping operations as is well known in the art. The steel is preferably copper plated to prevent galvanic action that would otherwise occur between the copper water pipe 12 and the flared portion 16 of the clamp. The pipe can be readily soldered to the clamp.

Figure 2:
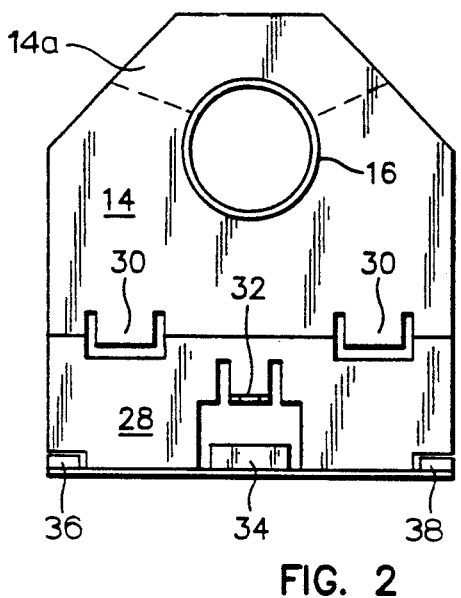
FIG. 2 is a rear elevation view of the preferred embodiment of my solderable pipe hanging clamp.
Figure 3:
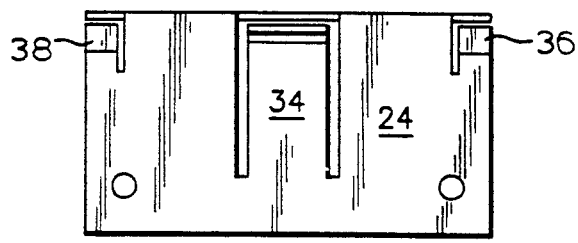
FIG. 3 is a bottom elevation view of the preferred embodiment of my solderable pipe hanging clamp.

While I have described a preferred embodiment of my pipe hanging clamp, it should be understood that modifications and adaptations thereof will occur to persons skilled in the art. For example, a portion 14a (FIG. 2) of the planar pipe supporting portion 14 may be cut away along the phantom lines. This enables the clamp to be snapped over the pipe 12 instead of having to slide it along its entire length. Therefore, the protection afforded my invention should only be limited in accordance with the scope of the following claims.

I claim:

1. A pipe hanging clamp, comprising:
a pipe supporting portion having a hole for receiving a segment of pipe therethrough;
a strap backing portion connected to the pipe supporting portion for overlying a side surface of a segment of strap normally supported between studs or joists of a building construction;
at least one locator element extending from the pipe supporting portion for insertion into a preselected hole in the segment of strap; and
retaining means connected to the pipe supporting portion and the strap backing portion for holding the strap backing portion against the side surface of the segment of strap, the retaining means including a pair of flanges for engaging a first side edge of the segment of strap and at least one spring for engaging a second side edge of the segment of strap.

2. A pipe hanging clamp according to claim 1 wherein the pipe supporting portion is generally planar.

3. A pipe hanging clamp according to claim 2 wherein the strap backing portion is generally planar and extends generally parallel to the pipe supporting portion.

4. A pipe hanging clamp according to claim 3 wherein the strap backing portion has a width approximately equal to a width of the segment of strap.

5. A pipe hanging clamp according to claim 4 wherein the pipe supporting portion is connected to a first side edge of the strap backing portion and the retaining means includes a generally planar bracket portion which is connected to a second side edge of the strap backing portion and extends generally orthogonal thereto.

6. A pipe hanging clamp according to claim 5 wherein the retaining means further includes a pair of flanges extending from the pipe supporting portion for engaging a first side edge of the segment of strap.

7. A pipe hanging clamp according to claim 6 wherein the retaining means includes at least one spring extending from the bracket portion for engaging a second side edge of the segment of strap.

8. A pipe hanging clamp according to claim 1 wherein the pipe supporting portion, strap backing portion, locator element and retaining means are integrally formed from a single piece of sheet metal.

9. A pipe hanging clamp, comprising:
a generally planar strap backing portion for overlying a first side surface of a segment of strap normally supported between studs or joists of a building construction, the strap backing portion having a width approximately equal to a width of the segment of strap between a first side edge of the segment of strap and a second side edge of the segment of strap;

a generally planar pipe supporting portion connected to a first side edge of the strap backing portion and extending generally parallel with the strap backing portion, the pipe supporting portion having a flared portion defining a hole for receiving a segment of pipe therethrough, the flared portion being dimensioned and configured for engaging the segment of pipe for enabling the flared portion to be soldered to the segment of pipe;

a locator element extending from the pipe supporting portion for insertion into a preselected hole in the segment of strap; and retaining means for holding the strap backing portion overlapping the fist side surface of the segment of strap, including a pair of flanges extending from the pipe supporting portion for overlying a second side surface of the segment of strap, a generally planar bracket portion connected to a second side edge of the strap backing portion, and at least one spring extending from the bracket portion for engaging and pressing against the second side edge of the segment of strap.

10. A pipe hanging clamp according to claim 9 wherein the strap backing portion, pipe supporting portion, locator element and retaining means are integrally formed from a single piece of sheet metal.

11. A pipe hanging clamp according to claim 10 wherein the sheet metal is copper plated steel.

12. A pipe hanging clamp according to claim 9 wherein the retaining means includes a centrally located main spring and a pair of locator springs extending from the bracket portion on for engaging and pressing against the second side edge of the segment of strap.

13. A pipe hanging clamp according to claim 10 wherein the piece of sheet metal is bent in a generally L-shaped configuration.

14. A pipe handling clamp, comprising:
a generally planar pipe supporting portion having a hole for receiving a segment of pipe therethrough;

a generally planar strap backing portion connected to the pipe supporting portion for overlying a side surface of a segment of strap normally supported between studs or joists of a building construction, the strap backing portion extending generally parallel to the pipe supporting portion and having a width approximately equal to a width of the segment of strap;

at least one locator element extending from the pipe supporting portion for insertion into a preselected hole in the segment of strap;

retaining means connected to the pipe supporting portion and the strap backing portion for holding the strap backing portion against the side surface of the segment of strap; and the pipe supporting portion being connected to a first side edge of the strap backing portion and the retaining means including a generally planar bracket portion which is connected to a second side edge of the strap backing portion and extends generally orthogonal thereto.

15. A pipe hanging clamp according to claim 14 wherein the retaining means further includes a pair of flanges extending from the pipe supporting portion for engaging a first side edge of the segment of strap.

16. A pipe hanging clamp according to claim 15 wherein the retaining means includes at least one spring extending from the bracket portion for engaging a second side edge of the segment of strap.

17. A pipe hanging clamp according to claim 15 wherein the pipe supporting portion, strap backing portion, locator element and retaining means are integrally formed from a single piece of sheet metal.

18. A pipe hanging clamp according to claim 17 wherein the piece of sheet metal is bent in a generally L-shaped configuration.

* * * * *